US009484992B2

(12) United States Patent
Kang et al.

(10) Patent No.: US 9,484,992 B2
(45) Date of Patent: Nov. 1, 2016

(54) METHOD AND APPARATUS FOR PERFORMING ANTENNA VIRTUALIZATION USING POLARIMETRIC ANTENNA IN A WIRELESS COMMUNICATION SYSTEM (71) Applicants: LG ELECTRONICS INC., Seoul (KR); KOREA ADVANCED INSTITUTE OF SCIENCE AND TECHNOLOGY, Daejeon (KR)

(72) Inventors: Jiwon Kang, Seoul (KR); Jaehoon Chung, Seoul (KR); Sae-Young Chung, Daejeon (KR); Wonseok Jeon, Daejeon (KR); Hyunsoo Ko, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/895,140

(22) PCT Filed: Feb. 28, 2014

(86) PCT No.: PCT/KR2014/001676
§ 371 (c)(1),
(2) Date: Dec. 1, 2015

(87) PCT Pub. No.: WO2014/196722
PCT Pub. Date: Dec. 11, 2014

(65) Prior Publication Data
US 2016/0119040 A1  Apr. 28, 2016

Related U.S. Application Data (60) Provisional application No. 61/830,610, filed on Jun. 3, 2013.

(51) Int. Cl.
*H04B 1/04* (2006.01)
*H04B 7/04* (2006.01)
(Continued)

(52) U.S. Cl.
CPC .......... *H04B 7/0408* (2013.01); *H01Q 21/245* (2013.01); *H04B 7/10* (2013.01)

(58) Field of Classification Search
USPC ....................................... 455/129
See application file for complete search history.

(56) References Cited

U.S. PATENT DOCUMENTS 7,355,546 B2 * 4/2008 Randall ................. G01S 7/024
342/104
2006/0069531 A1 3/2006 Goldberg
(Continued)

FOREIGN PATENT DOCUMENTS

| KR | 10-2009-0113892 A | 11/2009 |
| KR | 10-2012-0016237 A | 2/2012 |
| WO | WO 2012/141632 A1 | 10/2012 |

*Primary Examiner* — Creighton Smith
(74) *Attorney, Agent, or Firm* — Birch, Stewart, Kolasch & Birch, LLP (57) ABSTRACT A method and apparatus for transmitting a signal using a polarimetric antenna to a reception apparatus in a wireless communication system are disclosed. The method includes generating a first matrix using a radiation pattern of the polarimetric antenna, calculating a second matrix that maximizes channel capacity, determining an antenna virtualization matrix by Singular Value Decomposition (SVD) based on the first and second matrices, and transmitting a signal to the reception apparatus using the antenna virtualization matrix.

10 Claims, 4 Drawing Sheets (51) Int. Cl.
   *H04B 7/10*   (2006.01)
   *H01Q 21/24*   (2006.01)

(56) References Cited

U.S. PATENT DOCUMENTS

| | | |
|---|---|---|
| 2008/0232502 A1 | 9/2008 | Wild et al. |
| 2009/0262011 A1* | 10/2009 | Calderbank ........... G01S 13/284 342/188 |
| 2011/0188586 A1 | 8/2011 | Bidigare et al. |
| 2012/0162012 A1 | 6/2012 | Marzouki et al. |
| 2012/0230443 A1* | 9/2012 | Seok .................... H04B 7/0632 375/260 |
| 2015/0029986 A1* | 1/2015 | Seok .................... H04B 7/0632 370/329 |

* cited by examiner

METHOD AND APPARATUS FOR PERFORMING ANTENNA VIRTUALIZATION USING POLARIMETRIC ANTENNA IN A WIRELESS COMMUNICATION SYSTEM

CROSS REFERENCE TO RELATED APPLICATIONS

This application is the National Phase of PCT International Application No. PCT/KR2014/001676, filed on Feb. 28, 2014, which claims priority under 35 U.S.C. 119(e) to U.S. Provisional Application No. 61/830,610, filed on Jun. 3, 2013, all of which are hereby expressly incorporated by reference into the present application.

TECHNICAL FIELD

The present invention relates to a wireless communication system, and more particularly, to a method and apparatus for transmitting a signal using a polarimetric antenna in a wireless communication system.

BACKGROUND ART

In the present invention, coupling between elements of a polarimetric antenna is considered. Coupling between antenna elements changes an antenna radiation pattern, compared to an ideal antenna radiation pattern. Accordingly, there is a need for efficiently controlling coupling between antenna elements. Although studies have recently been conducted to remove coupling between antennas in a communication system, the present invention is intended to maximize the amount of information transmitted in a free space by a transmission antenna array, rather than coupling itself is removed.

On the assumption that an antenna radiation pattern is given through pre-measurement, the present invention is intended to design an efficient antenna virtualization matrix based on the radiation pattern, in the case where coupling is reflected in terms of channel capacity.

DISCLOSURE

Technical Problem

An object of the present invention devised to solve the problem lies on a method and apparatus for transmitting a signal through a polarimetric antenna in a wireless communication system.

Another object of the present invention lies on designing an antenna virtualization matrix that enables transmission of a maximum amount of information through a polarimetric antenna.

Technical Solution

The object of the present invention can be achieved by providing a method for transmitting a signal using a polarimetric antenna to a reception apparatus at a transmission apparatus in a wireless communication system. The method includes generating a first matrix using a radiation pattern of the polarimetric antenna, calculating a second matrix that maximizes channel capacity, determining an antenna virtualization matrix by Singular Value Decomposition (SVD) based on the first and second matrices, and transmitting a signal to the reception apparatus using the antenna virtualization matrix.

In another aspect of the present invention, provided herein is a transmission apparatus for transmitting a signal using a polarimetric antenna to a reception apparatus in a wireless communication system. The transmission apparatus includes a processor configured to generate a first matrix using a radiation pattern of the polarimetric antenna, to calculate a second matrix that maximizes channel capacity, and to determine an antenna virtualization matrix by SVD based on the first and second matrices, and a transmission module configured to transmit a signal to the reception apparatus using the antenna virtualization matrix.

The first matrix may be $$W = \begin{bmatrix} J_{11} & \cdots & J_{K1} \\ \vdots & \ddots & \vdots \\ J_{1M} & \cdots & J_{KM} \end{bmatrix} (M \geq K)$$

and Jip may be determined by [Equation A], $$J_{ip} = -\frac{1}{nk^2\sigma_p} \int_V E_i(r) \cdot u_p^*(r)\, d\Omega, \quad [\text{Equation A}]$$

$$i = 1, \ldots, K, p = 1, \ldots, M.$$

where $\eta=120\pi$, k is the number of waves, $\sigma_p$ is a singular value, $\{E_i(r)\}$ is a set of measured radiation patterns, and $u_p(r)$ is a vector field that orthogonalizes a channel sphere S of the transmission apparatus.

The second matrix may be $T=\text{diag}\{T_1, \ldots, T_M\}$ determined by [Equation B],

[Equation B]

$$T_p = \begin{cases} \frac{\eta k^2 R_V^3}{4}\left[j_{n-1}^2(kR_V) + j_n^2(kR_V) - \frac{2n+1}{kR_V}j_{n-1}(kR_V)j_n(kR_V)\right], p = 1, 3, \ldots, \\ \frac{\eta k^2 R_V^3}{4}\left\{\frac{n+1}{2n+1}\left[j_{n-2}^2(kR_V) + j_{n-1}^2(kR_V) - \frac{2n-1}{kR_V}j_{n-2}(kR_V)j_{n-1}(kR_V)\right] + \frac{n}{2n+1}\left[j_n^2(kR_V) + j_{n+1}^2(kR_V) - \frac{2n+3}{kR_V}j_n(kR_V)j_{n+1}(kR_V)\right]\right\}, p = 2, 4, \ldots, \end{cases}$$

where $j_n(\bullet)$ is a spherical Bessel function satisfying $$n = \left\lceil \sqrt{\frac{p+2}{2}} - 1 \right\rceil.$$

The channel capacity may converge according to [Equation C], $$C \rightarrow \max_{K:tr(W^*TWK) \leq P} W\log\left|I_K + \frac{\alpha}{N_0 W}W^*TWK\right| \quad [\text{Equation C}]$$

where K is a covariance matrix of an input signal, $N_0$ is a noise power density, W is a bandwidth of a channel, and $\alpha$ is a normalized density of reception antennas.

The antenna virtualization matrix (V=UΛ) may be determined by performing SVD by [Equation D], $$(W^*TW)^{-1}-U\Lambda U^*$$ [Equation D]

Advantageous Effects

According to embodiments of the present invention, a signal including a maximum amount of information may be transmitted using a polarimetric antenna in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings.

Before describing the present invention, polarization and a polarimetric antenna will be described.

Polarization refers to the trace of an electric field drawn on the plane perpendicular to the direction of travel of electromagnetic waves.

The polarimetric antenna first introduced in 2001 was designed in order to maximize the degree of freedom using polarization. The polarimetric antenna includes co-located three magnetic dipoles and three electric dipoles. The degree-of-freedom gain from using the polarimetric antenna may be 6 at maximum. With three electric dipoles, a degree-of-freedom gain of 3 may be achieved.

Recently, the degree-of-freedom gain from using a polarimetric antenna array has been analyzed. Particularly, the analysis reveals that compared to a conventional Uniform Linear Array (ULA), the polarimetric antenna array achieves degree-of-freedom gains listed in [Table 1] below.

TABLE 1

| Channel | Array Geometries | | | |
| --- | --- | --- | --- | --- |
|  | Point | Linear | Planar | Volumetric |
| Fully-scattered | 6 | 6 | 4 | 2 |
| Azimuth-scattered | 6 | 4 | 2 | 2 |

Even though a polarimetric antenna can be modeled simply in theory, antenna elements are densely arranged and thus severe coupling may occur between antenna elements in the polarimetric antenna. As a result, a signal is not radiated efficiently. To avert this problem, studies are underway from various aspects, including design of an antenna matching network in the field of integrated antenna structures.

Figure 1:
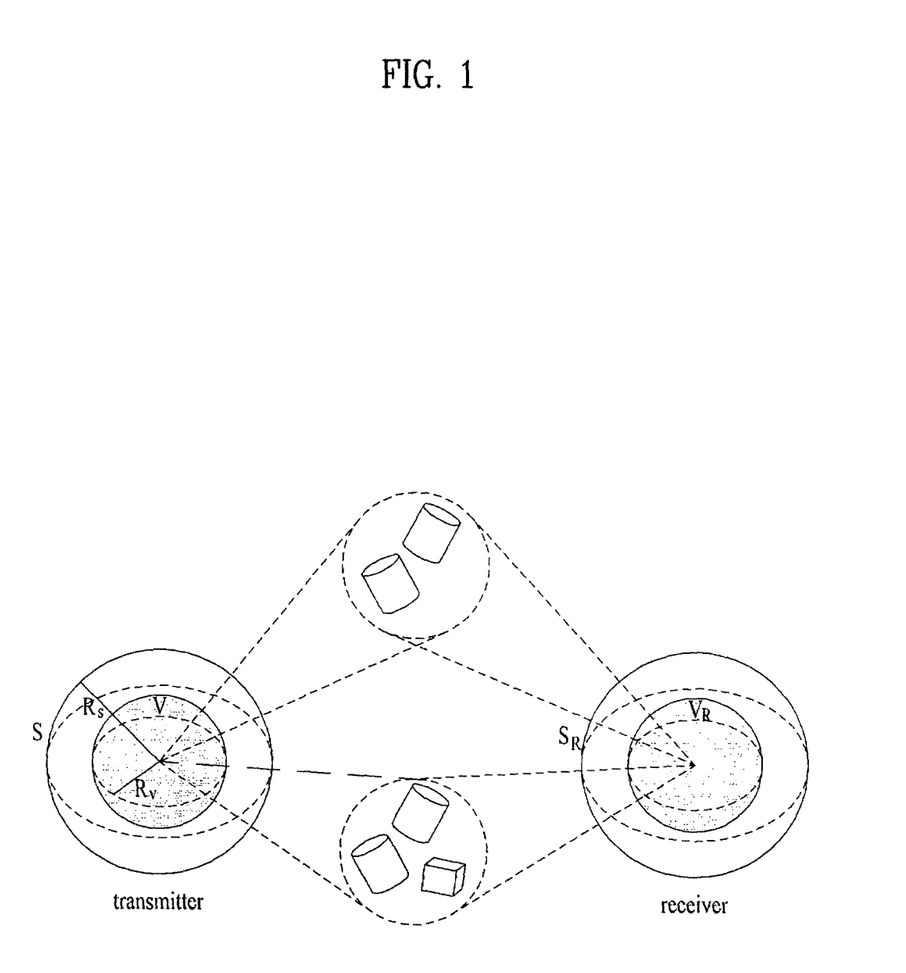
FIG. 1 illustrates an exemplary distributed channel model.

Before describing the present invention, a distributed channel model will be described below. FIG. 1 illustrates an exemplary distributed channel model.

Referring to FIG. 1, it is assumed that a Transmission (Tx) antenna array and a Reception (Rx) antenna array are integrated in respective spheres V and $V_R$. In this case, channels are divided into (1) channels directed to an outer sphere S from the Tx antenna array, (2) channels with radiated electric fields experiencing reflection or refraction from a reflector, and (3) channels with electric fields that form signals of the Rx antenna array.

Figure 2:
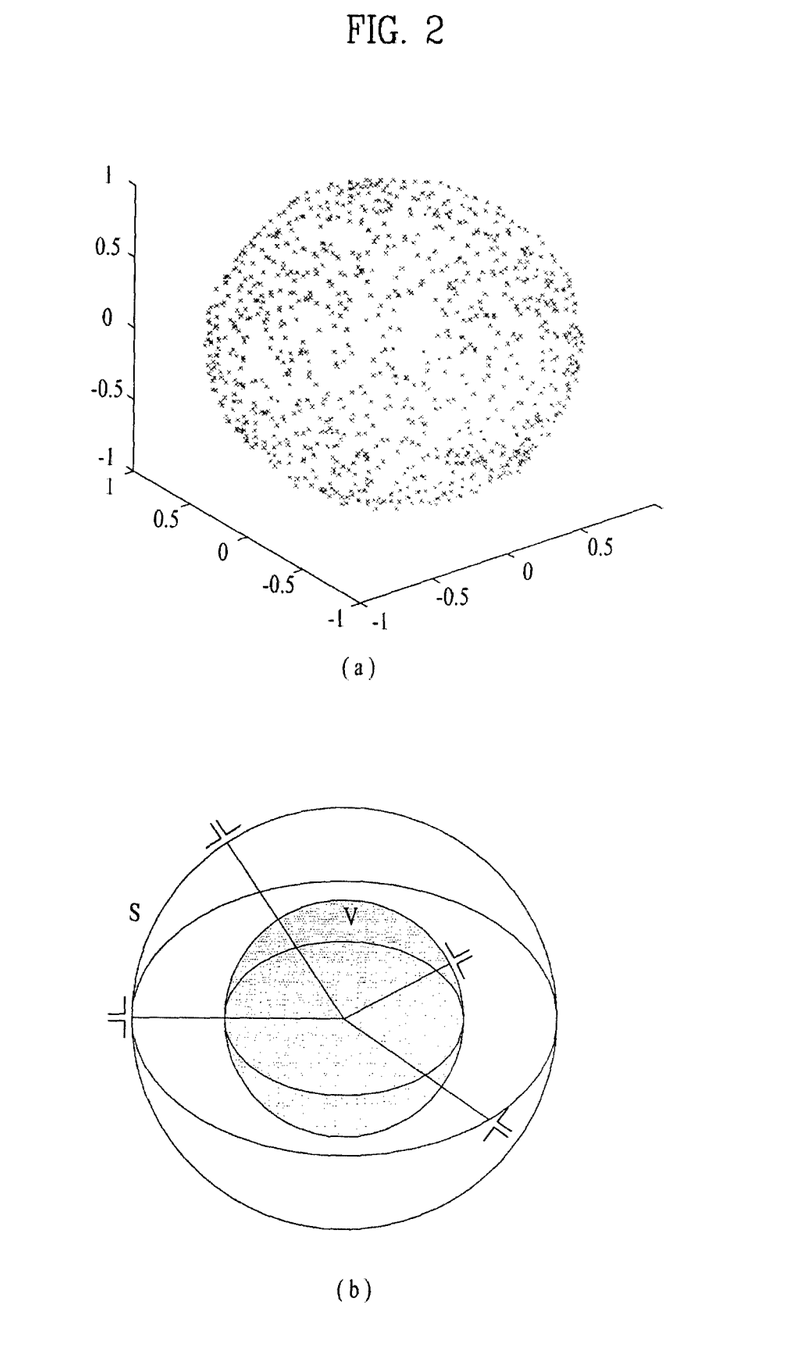
FIG. 2 illustrates an analysis model for distributed channels.

The present invention is intended to design an antenna virtualization matrix that enables transmission of a maximum amount of information, centering on the channels directed to the outer sphere S from the Tx antenna array. For this purpose, information about the channels directed to the outer sphere S from the Tx antenna array, that is, the radiation pattern of each antenna port measured in consideration of antenna coupling. It is assumed that the radiation pattern of each antenna port is given based on pre-measurement. Particularly, FIG. 2 illustrates a channel analysis model according to the present invention. It is assumed in FIG. 2 that a huge number of Rx antennas are placed at uniformly sampled points on the sphere S in order to analyze channel capacity.

With reference to FIGS. 1 and 2, channels will be analyzed theoretically in the present invention.

On the assumption of a Tx antenna array exists inside the sphere V, an electric field E(r) that the Tx antennas create in the sphere S is expressed as [Equation 1] by a Green function.

$$E(r)=i\omega\mu\int_V G(r,r')J(r')dr'$$ [Equation 1]

where ω is a carrier frequency and μ is the permeability of a transmission medium. Even though a plurality of Tx antenna arrays exist inside the sphere V, all related current distributions are represented as J(r). It is also assumed that an overall transmission system is restricted to power consumption at or below level P.

A) Singular Value Decomposition (SVD) in Spherical Coordinate System

If Tx antenna channels are focused on as described above, SVD may be performed in a spherical coordinate system in a similar manner to for Multiple Input Multiple Output (MIMO). Orthogonal bases for SVD are given as [Equation 2].

$$U_{nm1}(r) = \nabla \times rh_n^{(1)}(kr)_{nm}(\theta, \phi),$$

$$U_{nm2}(r) = \frac{1}{k}\nabla \times \nabla \times rh_n^{(1)}(kr)Y_{nm}(\theta, \phi),$$

$$V_{nm1}(r) = \nabla \times rj_n(kr)Y_{nm}(\theta, \phi),$$

$$V_{nm2}(r) = \frac{1}{k}\nabla \times \nabla \times rj_n(kr)Y_{nm}(\theta, \phi),$$

[Equation 2]

In [Equation 2], it is assumed that $\{U_{nm1}\}$ orthogonalizes the sphere of a receiver and $\{V_{nm1}\}$ orthogonalizes the sphere of a transmitter. Based on the assumption, the Green function that relates currents to radiated electric fields is expressed as [Equation 3] using singular values $\sigma_p$.

$$G(r, r') = ik \sum_{p=1}^{\infty} \sigma_p u_p(r) v_p^\dagger(r'), \ r \in S, \ r' \in V, \quad \text{[Equation 3]}$$

where $u_p$ and $v_p$ are normalized bases of the orthogonal bases. A current distribution inside the sphere may be decomposed as [Equation 4] using the normalized bases.

$$J(r) = \sum_{p=1}^{\infty} J_p v_p(r) \quad \text{[Equation 4]}$$

Finally, the electric fields are represented as [Equation 5] using a conventional transform equation.

$$E(r) = -\omega \mu k \sum_{p=1}^{\infty} \sum_{p'=1}^{\infty} \sigma_p J_{p'} u_p(r) \int_V v_p^*(r') \cdot v_{p'}(r') \, dr'$$

$$= -\eta k^2 \sum_{p=1}^{\infty} \sigma_p J_p u_p(r), \ r \in S, \quad \text{[Equation 5]}$$

One thing to note herein is that if information about radiated electric fields is given, $J_p$ may be obtained reversely using $\sigma_p$ and constants. This property may be applied to antenna virtualization.

B) Channel Input

The following description is given with the appreciation that there are K Tx antennas. A channel input is given as $x=[x_1, \ldots, x_R]^T$. If the channel input is all 1s, the resulting current signals are defined as $J_1(r), \ldots, J_K(r)$. Coupling between antennas is already reflected in the signals. The afore-defined current distribution is eventually expressed as [Equation 6].

$$J(r) = \sum_{i=1}^{K} x_i J_i(r). \quad \text{[Equation 6]}$$

If constant coefficients obtained from SVD of $J_1(r), \ldots, J_K(r)$ in [Equation 6] are $w_i=[J_{i1}, \ldots, J_{iM}]^T$, an antenna virtualization matrix may be designed using $w=[w_1, \ldots, w_K]$. Herein, M is related to the used channels. While M is decomposed into an infinite number of channels by SVD, it is assumed that M is a given value based on measurements in the present invention.

C) Method for Forming Matrix W

A matrix W may be calculated using the above-described radiation pattern. Specifically, i) it is assumed that a radiation pattern achieved by inputting a known signal (e.g., $x_1=1$) only to one port and inputting no signal to the other ports is given ($E_1(r)$). ii) An orthogonalization method described as [Equation 7] is used for $w_1$. iii) $w_2, \ldots, w_K$ may be calculated in the same manner and thus it is possible to calculate the matrix W finally.

$$J_{1p} = -\frac{1}{\eta k^2 \sigma_p} \int_V E_1(r) \cdot u_p^*(r) \, d\Omega \quad \text{[Equation 7]}$$

D) Channel Capacity of Tx Channels

Before analyzing channel capacity, radiation resistance is defined as [Equation 8].

$$R_{rad,p} = \frac{T_p}{R_V}, \quad \text{[Equation 8]}$$

where $T_p$ is given by

[Equation 9]

$$T_p = \begin{cases} \frac{\eta k^2 R_V^3}{4} \left[ j_{n-1}^2(kR_V) + j_n^2(kR_V) - \frac{2n+1}{kR_V} j_{n-1}(kR_V) j_n(kR_V) \right], \ p = 1, 3, \ldots, \\ \frac{\eta k^2 R_V^3}{4} \left\{ \frac{n+1}{2n+1} \left[ j_{n-2}^2(kR_V) + j_{n-1}^2(kR_V) - \frac{2n-1}{kR_V} j_{n-2}(kR_V) j_{n-1}(kR_V) \right] + \frac{n}{2n+1} \left[ j_n^2(kR_V) + j_{n+1}^2(kR_V) - \frac{2n+3}{kR_V} j_n(kR_V) j_{n+1}(kR_V) \right] \right\}, \ p = 2, 4, \ldots, \end{cases}$$

where $j_n(\bullet)$ represents a spherical Bessel function, satisfying $$n = \left\lceil \sqrt{\frac{p+2}{2}} - 1 \right\rceil.$$

Figure 3:
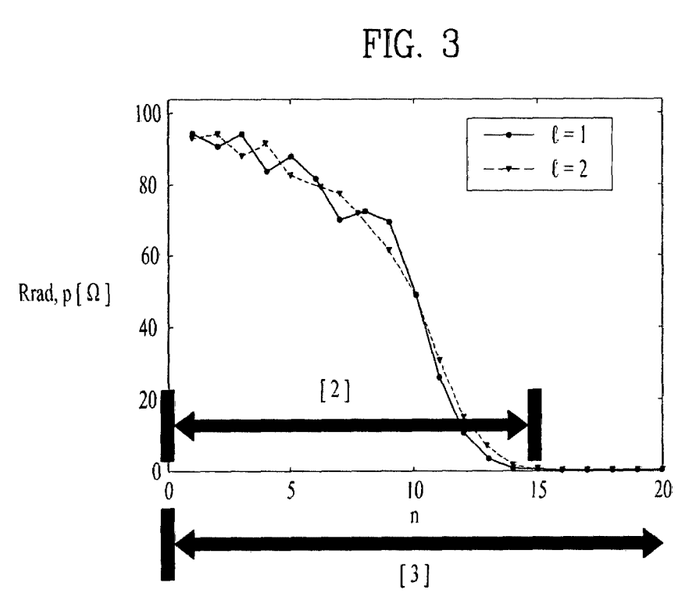
FIG. 3 is a graph illustrating radiation resistance values.

This may be plotted as a graph illustrated in FIG. 3. FIG. 3 illustrates radiation resistance values.

Referring to FIG. 3, reference numeral [2] denotes degree-of-freedom gains which are limited as an eigenvalue $\sigma_p^2$ decreases. Herein, $\sigma_p^2$ is proportional to $R_{rad,p}$. Reference numeral [3] denotes infinite degree-of-freedom gains achievable irrespective of decreased values of $R_{rad,p}$. This is because each subchannel can be used with the same performance under the condition of limited power irrespective of a decreasing radiation resistance value. A simple description will be given based on circuit-domain reasoning.

Figure 4:
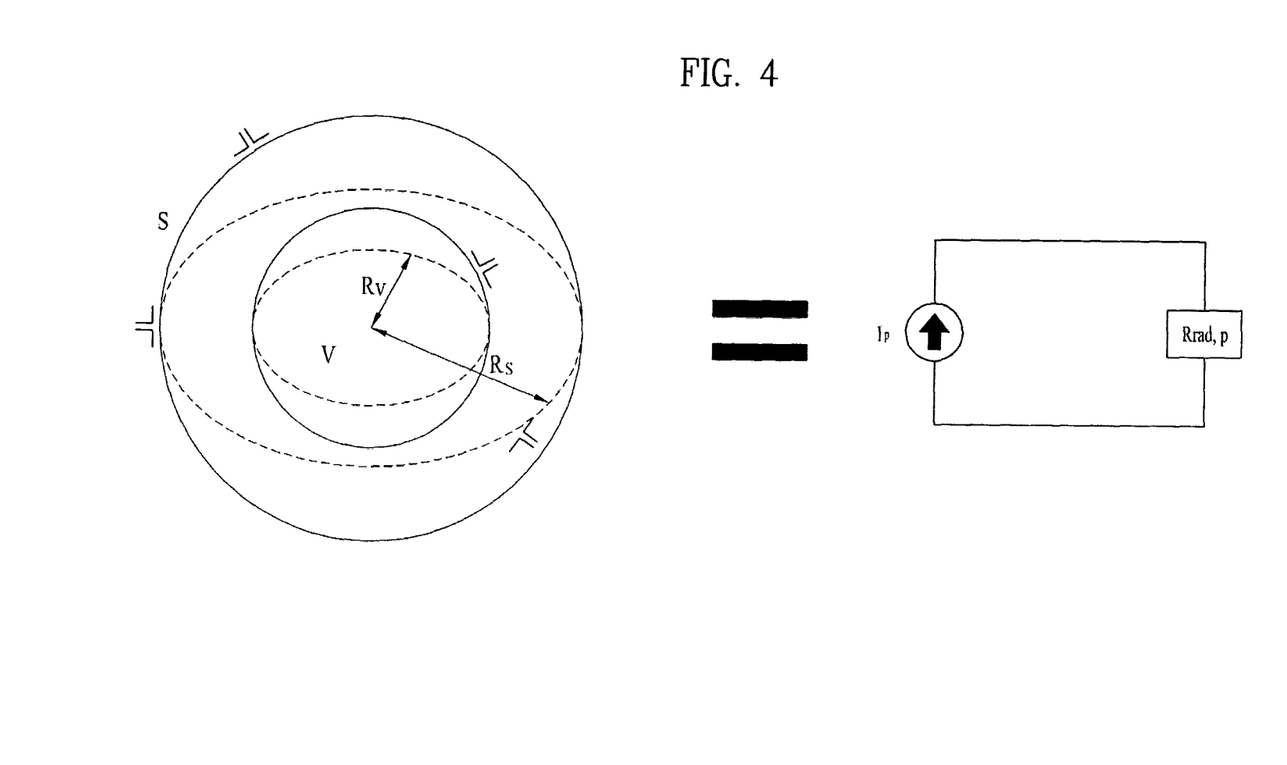
FIG. 4 illustrates a circuit to which a transmitter with a polarimetric antenna is simplified.

FIG. 4 illustrates a simplified circuit equivalent to a transmitter using a polarimetric antenna. Channels analyzed in the present invention may be regarded as channels transferring power from current. A current $I_p$ and a radiation resistance $R_{rad,p}$ are given to each subchannel. If power is limited to the same level P, it is possible to transmit the same power by increasing the magnitude of current even though the radiation resistance is low. That is, channels can be used with the same performance.

It is possible to configure $T=\text{diag}\{T_1, \ldots, T_M\}$ by [Equation 9]. Eventually, the channel capacity converges to $$C \to \max_{K: tr(W^*TWK) \leq P} W \log \left| I_K + \frac{\alpha}{N_0 W} W^* TWK \right| \quad \text{[Equation 10]}$$

where K is a covariance matrix of an input signal, $N_0$ is a noise power density. W is the bandwidth of a channel, and $\alpha$ is a normalized density of Rx antennas. If $$W^*TWK = \frac{P}{K}I_K,$$

the channel capacity is maximized. If $w_1, \ldots, w_K$ are linearly independent, that is, antennas have different radiation patterns, W is a full-rank matrix and T is full-rank. Therefore, W*TW becomes a matrix that allows inverse transformation. That is, when $$K = \frac{P}{K}(W^*TW)^{-1},$$

the channel capacity is optimized.

It is noted from the theoretical analysis that if $$K = \frac{P}{K}(W^*TW)^{-1},$$

the amount of information transmitted by the transmitter is maximized. If the same power is assigned to each stream, antenna virtualization is performed in the following order of Step 1 through Step 4. For the antenna virtualization, the following parameters are used:

Number of modes for antennas to be extended: M
Number of polarimetric antennas: K
Radius of the space (sphere) v limiting the size of the polarimetric antennas: $R_V$
Radius of the space (sphere) S in which a radiation pattern is measured: $R_S$
Set of measured radiation patterns: $\{E_i(r)\}$
Vector field that orthogonalizes the sphere $R_S$: $u_p(r)$
Parameter related to propagation: $\eta=120\pi$, and k is the number of waves.

Step 1: create $$W = \begin{bmatrix} J_{11} & \cdots & J_{K1} \\ \vdots & \ddots & \vdots \\ J_{1M} & \cdots & J_{KM} \end{bmatrix}$$

$(M \geq K)$ using [Equation 11] that describes a radiation pattern given for each antenna port.

$$J_{ip} = -\frac{1}{\eta k^2 \sigma_p} \int_V E_i(r) \cdot u_p^*(r) d\Omega, \quad \text{[Equation 11]}$$

$i = 1, \ldots, K, p = 1, \ldots, M.$

Step 2: For the given M, T is calculated ($T_p$ satisfies [Equation 8]).
Step 3: U and Λ are derived by SVD ((W*TW)$^{-1}$=UΛU*).
Step 4: A signal is transmitted by matrix-multiplication of an antenna virtualization matrix V=UΛ behind stream signals.

The receiver may receive a signal by V* based on the reciprocity of antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE FOR INVENTION

Various embodiments have been described in the best mode for carrying out the invention.

INDUSTRIAL APPLICABILITY

The method and apparatus for performing antenna virtualization using a polarimetric antenna in a wireless communication system according to the present invention are applicable to various wireless communication systems.

The invention claimed is:

1. A method for transmitting a signal using a polarimetric antenna to a reception apparatus at a transmission apparatus in a wireless communication system, the method comprising:
   generating a first matrix using a radiation pattern of the polarimetric antenna;
   calculating a second matrix that maximizes channel capacity;
   determining an antenna virtualization matrix by Singular Value Decomposition (SVD) based on the first and second matrices; and transmitting a signal to the reception apparatus using the antenna virtualization matrix.

2. The method according to claim 1, wherein the first matrix is $$W = \begin{bmatrix} J_{11} & \cdots & J_{K1} \\ \vdots & \ddots & \vdots \\ J_{1M} & \cdots & J_{KM} \end{bmatrix}$$

($M \geq K$) and $J_{ip}$ is determined by [Equation A], $$J_{ip} = -\frac{1}{\eta k^2 \sigma_p} \int_V E_i(r) \cdot u_p^*(r) d\Omega, \quad \text{[Equation A]}$$

$i = 1, \ldots, K,$ $p = 1, \ldots, M.$ where $\eta = 120\pi$, k is the number of waves, $\sigma_p$ is a singular value, $\{E_i(r)\}$ is a set of measured radiation patterns, and $u_p(r)$ is a vector field that orthogonalizes a channel sphere S of the transmission apparatus.

3. The method according to claim 2, wherein the second matrix is $T = \text{diag}\{T_1, \ldots, T_M\}$ determined by [Equation B], $$T_p \begin{cases} = \frac{\eta k^2 R_V^3}{4} [j_{n-1}^2(kR_V) + j_n^2(kR_V) - \\ \frac{2n+1}{kR_V} j_{n-1}(kR_V) j_n(kR_V)], \; p = 1, 3, \ldots, \\ = \frac{\eta k^2 R_V^3}{4} \{\frac{n+1}{2n+1} [j_{n-2}^2(kR_V) + j_{n-1}^2(kR_V) - \\ \frac{2n-1}{kR_V} j_{n-2}(kR_V) j_{n-1}(kR_V)] + \\ \frac{n}{2n+1} [j_n^2(kR_V) + j_{n+1}^2(kR_V) - \\ \frac{2n+3}{kR_V} j_n(kR_V) j_{n+1}(kR_V)]\}, \; p = 2, 4, \ldots, \end{cases} \quad \text{[Equation B]}$$

where $j_n(\bullet)$ is a spherical Bessel function satisfying $$n = \left\lceil \sqrt{\frac{p+2}{2}} - 1 \right\rceil.$$

4. The method according to claim 3, wherein the channel capacity converges according to [Equation C], $$C \to \max_{K: tr(W^*TWK) \leq P} W \log \left| I_K + \frac{\alpha}{N_0 W} W^*TWK \right| \quad \text{[Equation C]}$$

where K is a covariance matrix of an input signal, $N_0$ is a noise power density, W is a bandwidth of a channel, and $\alpha$ is a normalized density of reception antennas.

5. The method according to claim 3, wherein the determination of an antenna virtualization matrix ($V = U\Lambda$) comprises determining the antenna virtualization matrix by performing SVD by [Equation D], $$(W^*TW)^{-1} = U\Lambda U^* \quad \text{[Equation D]}.$$

6. A transmission apparatus for transmitting a signal using a polarimetric antenna to a reception apparatus in a wireless communication system, the transmission apparatus comprising:

a processor configured to generate a first matrix using a radiation pattern of the polarimetric antenna, to calculate a second matrix that maximizes channel capacity, and to determine an antenna virtualization matrix by Singular Value Decomposition (SVD) based on the first and second matrices; and a transmission module configured to transmit a signal to the reception apparatus using the antenna virtualization matrix.

7. The transmission apparatus according to claim 6, wherein the first matrix is $$W = \begin{bmatrix} J_{11} & \cdots & J_{K1} \\ \vdots & \ddots & \vdots \\ J_{1M} & \cdots & J_{KM} \end{bmatrix}$$

($M \geq K$)

and $J_{ip}$ is determined by [Equation A], $$J_{ip} = -\frac{1}{\eta k^2 \sigma_p} \int_V E_i(r) \cdot u_p^*(r) d\Omega, \quad \text{[Equation A]}$$

$i = 1, \ldots, K, \; p = 1, \ldots, M.$ where $\eta = 120\pi$, k is the number of waves, $\sigma_p$ is a singular value, $\{E_i(r)\}$ is a set of measured radiation patterns, and $u_p(r)$ is a vector field that orthogonalizes a channel sphere S of the transmission apparatus.

8. The transmission apparatus according to claim 7, wherein the second matrix is $T = \text{diag}\{T_1, \ldots, T_M\}$ determined by [Equation B], $$T_p \begin{cases} = \frac{\eta k^2 R_V^3}{4} [j_{n-1}^2(kR_V) + j_n^2(kR_V) - \\ \frac{2n+1}{kR_V} j_{n-1}(kR_V) j_n(kR_V)], \; p = 1, 3, \ldots, \\ = \frac{\eta k^2 R_V^3}{4} \{\frac{n+1}{2n+1} [j_{n-2}^2(kR_V) + j_{n-1}^2(kR_V) - \\ \frac{2n-1}{kR_V} j_{n-2}(kR_V) j_{n-1}(kR_V)] + \\ \frac{n}{2n+1} [j_n^2(kR_V) + j_{n+1}^2(kR_V) - \\ \frac{2n+3}{kR_V} j_n(kR_V) j_{n+1}(kR_V)]\}, \; p = 2, 4, \ldots, \end{cases} \quad \text{[Equation B]}$$

where $j_n(\bullet)$ is a spherical Bessel function satisfying $$n = \left\lceil \sqrt{\frac{p+2}{2}} - 1 \right\rceil.$$

9. The transmission apparatus according to claim 8, wherein the channel capacity converges according to [Equation C], $$C \to \max_{K: tr(W^*TWK) \leq P} W\log\left|I_K + \frac{\alpha}{N_0 W} W^*TWK\right| \quad \text{[Equation C]}$$

where K is a covariance matrix of an input signal, $N_0$ is a noise power density, W is a bandwidth of a channel, and $\alpha$ is a normalized density of reception antennas.

10. The method according to claim 8, wherein the processor determines the antenna virtualization matrix (V=UΛ) by performing SVD by [Equation D], $$(W^*TW)^1 = U\Lambda U^* \quad \text{[Equation D]}.$$

\* \* \* \* \*